(12) United States Patent
Schroeder

(10) Patent No.: US 6,449,401 B1
(45) Date of Patent: Sep. 10, 2002

(54) OPTICAL CROSS-SWITCH GAS INTRUSION DETECTOR AND DETECTION METHOD

(75) Inventor: Dale Schroeder, Scotts Valley, CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 40 days.

(21) Appl. No.: 09/775,284

(22) Filed: Jan. 31, 2001

(51) Int. Cl.[7] .................................................. G02B 6/00
(52) U.S. Cl. .............................. 385/12; 385/16; 385/17; 385/18
(58) Field of Search .......................... 385/16–24, 40–42, 385/14, 131, 132, 12

(56) References Cited

U.S. PATENT DOCUMENTS 5,699,462 A * 12/1997 Fouquet et al. ............... 385/18
6,324,316 B1 * 11/2001 Fouquet et al. ............... 385/16

* cited by examiner

*Primary Examiner*—Phan T. H. Palmer

(57) ABSTRACT

A system and method are provided for detection of gas intrusion into a fluid-containing device. The fluid-containing device has a first waveguide and a second waveguide that intersect at a trench such that optical coupling between the first and second waveguides is dependent upon an absence of a fluid in the trench. The fluid containing device includes a fluid removal mechanism for removing fluid to the trench to switch the fluid-containing device. An optical connection is made between first ends of the first and second waveguides and a light source provides a light at a second end of the first waveguide and a detector detects the light at a second end of the second waveguide. The times required to remove and return the fluid from the trench are used as an indicator of gas intrusion into the fluid containing device.

20 Claims, 3 Drawing Sheets

OPTICAL CROSS-SWITCH GAS INTRUSION DETECTOR AND DETECTION METHOD

TECHNICAL FIELD

The invention relates generally to optical cross-switches and more particularly to a detector for detecting gas intrusion into the optical cross-switches.

BACKGROUND ART

In the past, telecommunications and data communications networks have traditionally relied on electrical signals transmitted electrically on conductive lines. As higher and higher data exchange rates are required, conductive lines are no longer sufficient and increasingly the data is transmitted through the use of optical signals through optical fibers. Equipment for efficiently generating and transmitting the optical signals has been designed and implemented, but the manufacturability of optical switches for use in telecommunications and data communications networks is problematic.

Fouquet et al. (U.S. Pat. No. 5,699,462), which is assigned to the assignee of the present invention, describes a switching matrix that is used for routing optical signals from any one of a number of parallel input optical fibers to any one of a number of parallel output optical fibers.

Referring now to FIG. 1 (PRIOR ART), therein is shown an isolated optical switching element 10 formed on a substrate 12. The substrate 12 is of silicon or silica. The optical switching element 10 includes planar waveguides defined by a lower cladding layer 14, a core 16, and an upper cladding layer 18. The core 16 is primarily silicon dioxide, but other materials that affect the index of refraction of the core may be used. The cladding layers 14 and 18 are formed of a material having a refractive index that is substantially different from the refractive index of the core material, so that optical signals are guided along the core material.

In the manufacturing process, the core 16 is patterned to define an input waveguide 20 and an output waveguide 26 of a first waveguide path and to define an input waveguide 24 and an output waveguide 22 of a second waveguide path. The upper cladding layer 18 is then deposited over the core 16. A trench 28 is etched through the core 16 at the intersection of the first and second waveguide paths and the two cladding layers 14 and 18 to the substrate 12. The waveguide paths intersect the trench 28 at an angle of incidence greater than the critical angle of total internal reflection (TIR) when the trench 28 is filled with a fluid, which can be a liquid, plasma, or a gas, having a refractive index which closely matches the refractive index of the waveguides; thus, light is transmitted to a "through" path to the output waveguide 22 when fluid is present in the trench 28.

Thus, TIR diverts light from the input waveguide 20 to a "reflected" path to the output waveguide 22, unless an index-matching fluid is located within the gap between the aligned waveguides 20 and 26. The trench 28 is positioned with respect to the four waveguides 20, 26, 24, and 22 such that one sidewall of the trench 28 passes through or is slightly offset from the intersection of the axes of the waveguide paths.

Referring now to FIG. 2 (PRIOR ART), therein is shown a plurality of the optical switching elements 10 in a 4 times 4 matrix 32. In the 4 times 4 matrix 32, any one of four input waveguides 34, 36, 38 and 40 may be optically coupled to any one of four output waveguides 42, 44, 46, and 48. The switching arrangement is referred to as "non-blocking," since any free input waveguide can be connected to any free output waveguide regardless of which connections have already been made through the switching arrangement. Each of the sixteen optical switches has a trench that causes TIR in the absence of an index-matching fluid at the gap between collinear waveguides, but collinear waveguides of a particular waveguide path are optically coupled when the gaps between the collinear waveguides are filled with the refractive index-matching fluid. Trenches in which the waveguide gaps are filled with fluid are represented by fine lines that extend at an angle through the intersections of optical waveguides in the array. On the other hand, trenches in which the index-matching fluid is absent at the gaps are represented by broad lines through a point of intersection.

For example, the input waveguide 20 of FIGS. 1 and 2 (PRIOR ART) is in optical communication with the output waveguide 22 as a result of reflection at the empty gap of the trench 28. Since all other cross points for allowing the input waveguide 34 to communicate with the output waveguide 44 are in a transmissive state, a signal that is generated at the input waveguide 34 will be received at output waveguide 44. In like manner, the input waveguide 36 is optically coupled to the first output waveguide 42, the third input waveguide 38 is optically coupled to the fourth output waveguide 48, and the fourth input waveguide 40 is coupled to the third output waveguide 46.

There are a number of available techniques for changing an optical switch of the type shown in FIG. 1 from a transmissive state to a reflective state and back to the transmissive state. One method of changing states involves forming and eliminating the gap by forming and removing vapor bubbles in a refractive index-matching fluid. A plurality of heating elements are used where the application of heat to a trench forms the vapor bubble to remove the fluid and the removal of the heat causes the vapor bubble to collapse and return the fluid. The heating elements are activated by leads on the reservoir substrate 52.

The refractive index-matching fluid is supplied from a reservoir under the trench and resides within the trench in the waveguide paths until a vapor bubble is formed to create an index mismatch and cause light to be reflected at the sidewall of a trench. Collapsing the vapor bubble returns the switch to the transmissive state. A bubble forms in less than 1 ms when heat is applied and collapses in less than 1 ms when heat is removed.

The refractive index-matching fluid has to be very free of contaminant gases, because the bubble required is a vapor bubble rather than a gas bubble. If there is gas present, the bubble consists of two parts, some vapor and the remainder gas. When heating ceases, the vapor part of the bubble collapses rapidly leaving a small gas bubble that dissolves slowly, over 10 ms to 10 sec. If there is too much gas in the refractive index-matching fluid, the rise-and-fall times of the bubble, which correspond to the switching times-on and off of the reflected and through-path signals, are degraded.

The gas, generally air, intrudes into the refractive index-matching fluid by improper handling when the optical switching element 10 is filled, improper initial degassing, from leaks, or by osmosis that occurs into the optical switching element 10 over time.

In the past, there was no way of telling whether or not there was gas in the refractive index-matching fluid or how much gas there was in the fluid other than to suddenly have a change in switching times. There existed no way to directly monitor the switching time and an indication of gas would come in terms of an unanticipated failure of the switch.

The above problem arises because it was not possible to determine how long it takes the light to go from one path to the other. In the optical switching element 10, light coming in is from an independent outside source and the light going out goes to an independent outside receiver, neither of which can be tapped for information. Unlike an electrical circuit where it is possible to make a parallel test connection, in optical circuits, parallel connections cause losses in the signal.

Those skilled in the art have long sought, with little-success, a way to be able to not only to detect how much gas is in the optical switching element 10 already, but also to predict what the failure time so that the optical switching element 10 can be replaced without causing a transmission outage.

DISCLOSURE OF THE INVENTION

The present invention provides a method for detection of gas intrusion into a fluid containing device. The fluid-containing device has a first waveguide and a second waveguide that intersect at a trench such that optical coupling between the first and second waveguides is dependent upon an absence of a fluid in the trench. The fluid is removed from the trench to switch the fluid-containing device. An optical connection is made between first ends of the first and second waveguides and a light source provides a light at a second end of the first waveguide and a detector detects the light at a second end of the second waveguide. The time required to return the fluid to the trench is used as an indicator of gas intrusion into the fluid containing device. This provides a way of telling whether or not there is gas in the refractive index-matching fluid and how much gas there is in the fluid without suddenly having a change in switching times. It further provides a way to directly monitor the switching time and an indication of gas without an unanticipated failure of the switch.

The present invention further provides a system for detection of gas intrusion into a fluid-containing device. The fluid-containing device has a first waveguide and a second waveguide that intersect at a trench such that optical coupling between the first and second waveguides is dependent upon an absence of a fluid in the trench. The fluid containing device includes a fluid removal mechanism for removing fluid from the trench to switch the fluid-containing device. An optical connection connects first ends of the first and second waveguides and a light source provides a light at a second end of the first waveguide and a detector detects the light at a second end of the second waveguide. The time required to return the fluid to the trench is used as an indicator of gas intrusion into the fluid containing device. This system provides a way of telling whether or not there is gas in the refractive index-matching fluid and how much gas there is in the fluid without suddenly having a change in switching times. It further provides a way to directly monitor the switching time and an indication of gas without an unanticipated failure of the switch.

The above and additional advantages of the present invention will become apparent to those skilled in the art from a reading of the following detailed description when taken in conjunction with the accompanying drawings.

BEST MODE FOR CARRYING OUT THE INVENTION

Figure 3:
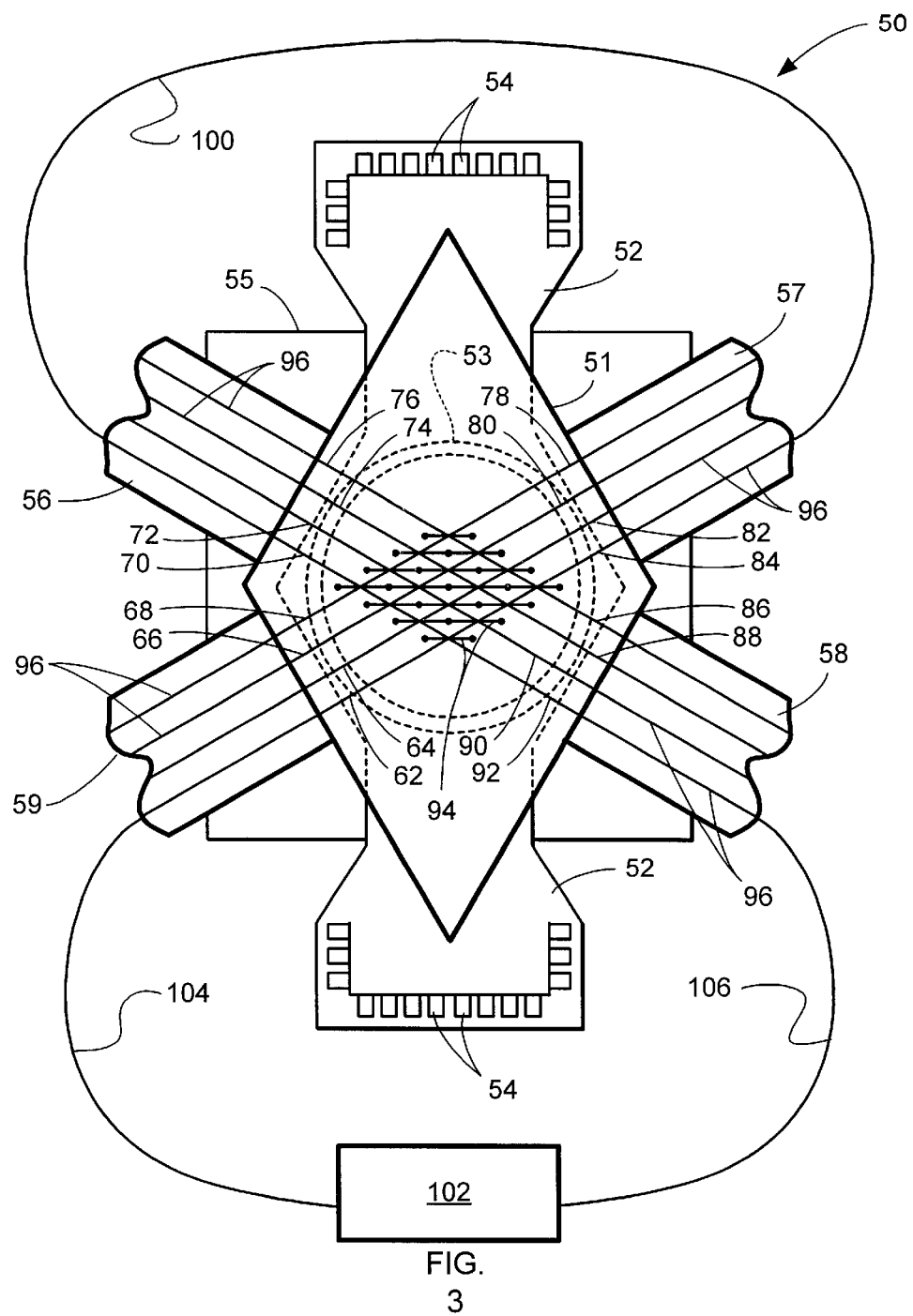
FIG. 3 is a top view of an optical cross-connect switch having optical paths that intersect trenches are supplied with fluid in a structure manufactured in accordance with the present invention.

Referring now to FIG. 3, therein is shown a top view of an optical cross-connect switch 50 having a planar lightwave circuit (PLC) 51, which is shown atop a reservoir substrate 52. The reservoir substrate 52 is spaced apart from the PLC 51 by a sealing/bonding ring 53 to form a reservoir for a refractive index-matching fluid as will later be explained. The reservoir substrate 52 also supports bubble-forming elements, such as heaters (not shown), which are attached by patterned electrical leads to bond pads 54 at the edges of the reservoir substrate 52. The bond pads 54 are then connected to bubble forming circuitry (not shown) for operating the bubble forming elements. The reservoir substrate 52 is on a mounting bracket 55.

The PLC 51 has a four-sided configuration and one of four fiber array substrates 56, 57, 58 and 59 are attached to each side. Each of the four fiber array substrates 56, 57, 58 and 59 is fabricated to extend perpendicularly from an edge of the PLC 51 and each optical switching element will be substantially identical to the switching element 10 shown in FIG. 1. However, in one embodiment, the angles of incidence of the waveguide on the trench are in the range of 45° to 60°.

In one embodiment, the PLC 51 has sixteen input/output waveguides 62, 64, 66, 68, 70, 72, 74, 76, 78, 80, 82, 84, 86, 88, 90 and 92 (grouped as waveguides 62–68, 70–76, 78–84, and 86–92). There are also sixteen intersections or trenches 94 designated individually by their input and output waveguide numbers with a plus sign in between for each light path, such as the trench 62+92 for the trench at the intersection of the input waveguide 62 and output waveguide 92. As evident, the same trench will also have the designation 70+84 for the light path from the input waveguide 70 and the output waveguide 84. Typically, the operations of the switching matrix that are of greatest concern are the operations that determine the optical coupling of the input waveguides 62–68 with the output waveguides 86–92. The remaining waveguides 70–84 may be used for add and drop operations or to connect to other switches to form a larger scale switching matrix.

Each of the waveguides 62–92 is formed of a core material, such as $SiO_2$ that is doped with Ge or $TiO_2$, to define a first refractive index. Cladding material may be primarily $SiO_2$, but with a different dopant, such as $B_2O_3$ and/or $P_2O_5$, to define a second refractive index different from the first refractive index. Because of the difference in refractive indices, optical signals are guided along the waveguide cores.

Each of the fiber array substrates 56, 57, 58 and 59 includes a plurality of optical fibers, for example, four optical fibers 96. The pitch of the fibers matches the pitch of the input/output waveguides on the PLC 51. An acceptable pitch is approximately 250 šm, but other center-to-center distances may be utilized, such as 500 šm. Ideally, the waveguides have the same cross sectional geometry as the optical fibers. However, it is not feasible to fabricate fiber array substrate waveguides having a circular cross section. Moreover, the 8 šm dimension of a conventional fiber is not necessarily optimal for waveguides for which optical signals must propagate through fluid-filled trenches in order to pass from one waveguide to a substantially collinear waveguide. It has been determined that transmission losses across fluid-filled gaps are reduced by increasing the cross sectional area of the waveguides. Thus, the waveguides 62–92 may be adiabatically tapered from a relatively large cross sectional area at the interior ends at the trenches 94 to a smaller cross sectional area at the interface with the optical fibers 96. The cross sectional geometry at the interior end is selected to achieve efficient optical coupling across the trenches, while the cross sectional geometry at the exterior ends is selected to achieve high coupling efficiency to the optical fibers. In one embodiment, the adiabatic tapering is from a 16 šm times 8 šm cross sectional geometry to an 8 šm square cross-sectional geometry. Alternatively, the adiabatic taper may be incorporated along the optical fibers 96, such as by using a thermally diffused, expanded-core (TEC) fiber. As is known in the art, TEC fibers have an expanding portion at the ends of the fibers.

While not shown in the top view of FIG. 3, the interface between the PLC 51 and each of the fiber array substrates 56, 57, 58 and 59 can be intentionally tilted at an angle, such as eight degrees. This intentional tilt is intended to decrease the magnitude of reflection between waveguides on the PLC 51 and optical fibers in the fiber array substrates 56, 57, 58 and 59.

Figure 1:
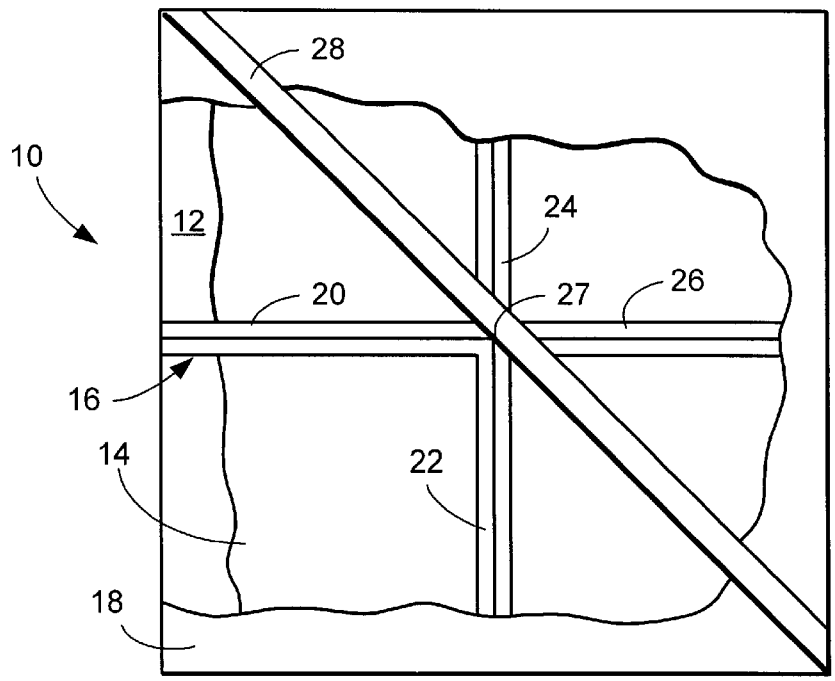
FIG. 1 (PRIOR ART) is a top view of an optical switching element that utilizes total internal rejection in accordance with the prior art.
Figure 2:
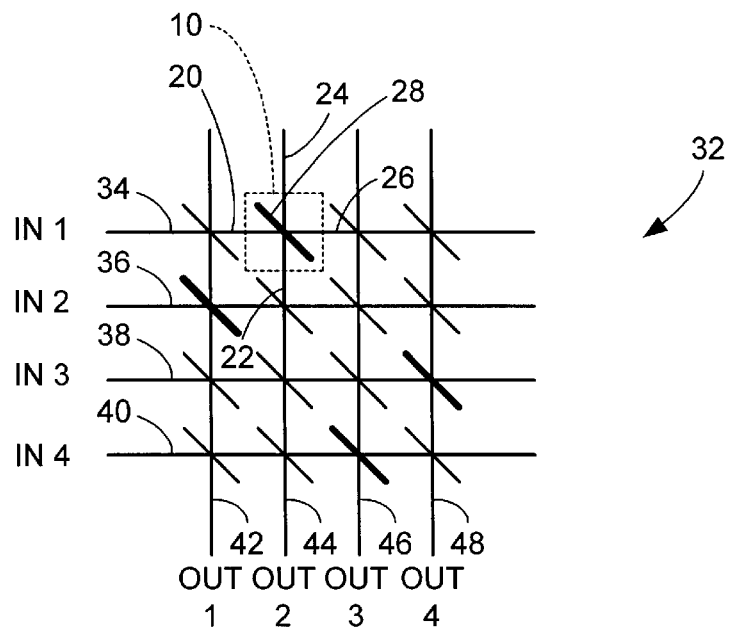
FIG. 2 PRIOR ART) is a 4 times 4 matrix of switching elements of FIG. 1 to allow connection any one of a number of input waveguides to any one of a number of output waveguides in accordance with the prior art.

As previously described with reference to FIG. 1, optical coupling among waveguides is dependent upon the presence or absence of the refractive index-matching fluid at the gaps between waveguide ends provided from the reservoir within the sealing/bonding ring 53 to all the trenches 94. For example, if the trench 62+92 does not include the refractive index-matching fluid, any signals from the waveguide 62 will be diverted by total internal reflection (TIR) to the waveguide 92. On the other hand, if the trench 62+92 is filled with the refractive index-matching fluid, the optical signal from waveguide 62 will propagate through the trench 62+92 to the next trench 62+90. Depending upon the presence or absence of fluid, the input signal from waveguide 62 may be diverted to any of the four waveguides 86–92 or propagated straight through to waveguide 84. This versatility applies to the other three waveguides 64, 66 and 68 that are adjacent to waveguide 62.

In the present invention, the waveguides 62, 84, 70, and 92 are used for optical cross-switch gas intrusion detection. The output waveguide 84 and the input waveguide 70 are coupled at their respective output and input ends by a fiber optic loop 100. An optical cross-switch gas intrusion light source and detector, the detector 102, is coupled by a fiber optic line 104 to the input waveguide 62 and the output waveguide 92 is coupled by a fiber optic line 106 back to the detector 102. While the light source may be of any type of illumination, a laser source is preferred.

In developing the present invention, it was observed that, when a bubble begins to form, it forms as a sphere, and it moves up into the trench as more vapor is formed as the fluid is brought to its boiling point. The bubble squeezes against the front edge of the trench and it has a rounded top on it. The rounded top blocks light because it scatters light into the PLC 51 rather than reflecting it down a waveguide. As the bubble grows, it starts to flatten in the trench and to mirror the light. As the bubble grows fully, a full mirror effect is established.

For example, the above bubble formation process, which takes place in under 1 ms, first causes the light to stop passing from the waveguide 62 into the waveguide 84 and to be scattered inside the PLC 51. When the bubble gets high enough, then light passes from the waveguide 62 into the waveguide 92. Thus, the light is attenuated out of the waveguide 62 as viewed at the waveguide 84 and goes out completely before light starts to appear out of the waveguide 92. This means that the optical cross-connect switch 50 operates as a break-before-make switch.

When the bubble it is formed purely by vapor and if there is gas in the system, after a period of time, the gas will come out of solution due to the higher temperature in the region of the bubble and add to the volume of the bubble. The bubble increases in size and becomes a combination of vapor and gas. The amount of gas in the bubble depends on its concentration in the fluid. The higher the concentration, the larger percentage of the bubble will be gas. Typically, gas will come fully out of solution in the 100–500 ms range, but this effect can be detected with shorter bubble formation pulses of 50, 10, or even a few ms.

Conversely, when the bubble is collapsed, the vapor portion of the bubble collapses within 1 ms. However, the gas portion of the bubble can take anywhere from a half-second to fifteen seconds to reabsorb into the fluid depending on the amount of gas in the bubble. A switching time longer than 1 ms may be considered a switch failure.

Although the optical switches are sealed to the highest level possible, over time, the slow osmosis of gas through the seals and the material of the PLC 51 will result in gas intrusion and resulting failure of the optical cross-connect switch 50. Previously, it has not been possible to determine when the optical cross-connect switch 50 would fail.

In the present invention, the detector 102 outputs a light, such as a laser light, into the input waveguide 62.

When the trench 62+92 is filled with the fluid, the light will pass through the fluid to the output waveguide 84. From the output waveguide 84, the light will go into the fiber optic loop 100 and back into the input waveguide 70. Since the trench 62+92 is still filled with the fluid, the light will pass through the fluid to the input waveguide 92 and be input into the detector 102.

When a bubble is forming, the break-before-make characteristic will cause the light output from the detector 102 into the input waveguide 62 to be attenuated and stop passing into the output waveguide 84 and further be attenuated and stop passing from the input waveguide 70 into the output waveguide 92 and the input of the detector 102. When the bubble is formed and the trench 62+92 is empty of the fluid, the light will pass from the input waveguide 62 and be reflected by the bubble into the output waveguide 92 and back into the input of the detector 102.

When a bubble is collapsing, the break-before-make characteristic will cause the light output from the detector 102 into the input waveguide 62 to be attenuated and stop passing into the output waveguide 92 and the detector 102. When the bubble is collapsed and the trench 62+92 is full of the fluid, the light will pass from the input waveguide 62 through the trench 62+92 to the output waveguide 84. From the output waveguide 84, the light will be looped through the fiber optic loop 100 into the input waveguide 70 to pass through the trench 70+84 into the output waveguide 92 and the input of the detector 102. Since the same detector in the detector 102 is used to measure when the reflected light going through the trench 62+92 was stopped and when the light through the trench 62+92 appeared, it is possible to make a very high accuracy time determination.

It has been discovered that the time between the disappearance of the reflected light and the appearance of the through light is related to the amount of gas intrusion. If the switching time is fast, then the bubble is mostly vapor and there is almost no gas in the bubble. Conversely, if the switching time is slow, then the bubble is a combination of vapor and gas, and there is a large portion of gas.

Figure 4:
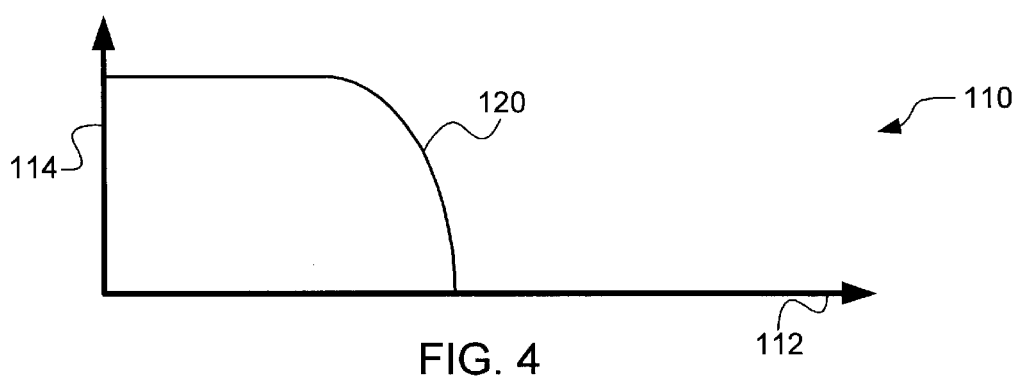
FIG. 4 is a schematic graph of a reflected signal of an optical cross-connect switch.

Referring now to FIG. 4, therein is shown a schematic graph 110 having a time axis 112 versus a light intensity axis 114. Shown on the schematic graph 1 10 is the plot of a reflected signal 120 of the optical cross-connect switch 50. As the bubble is collapsed, the reflected signal 120 drops from full value to zero.

Figure 5:
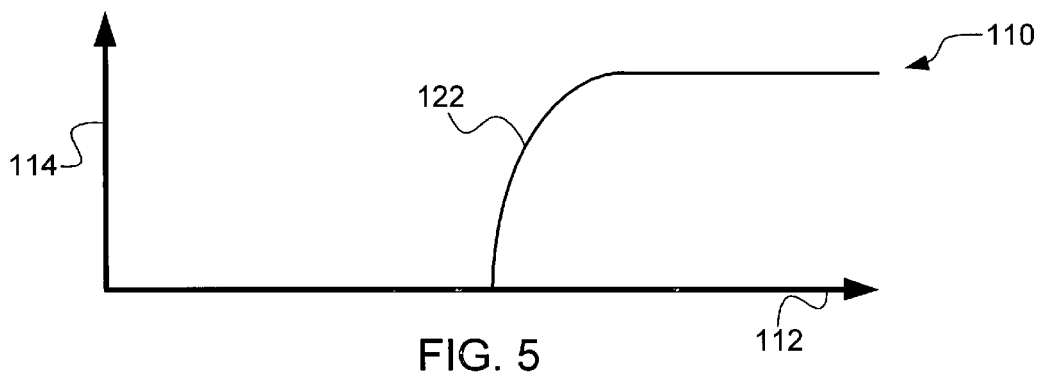
FIG. 5 is a schematic graph of a through signal of an optical cross-connect switch.

Referring now to FIG. 5, therein is shown a schematic graph 110 of a through signal 122 of the optical cross-connect switch 50. As the bubble is collapsed, the through signal 122 increases from zero to full value.

Figure 6:
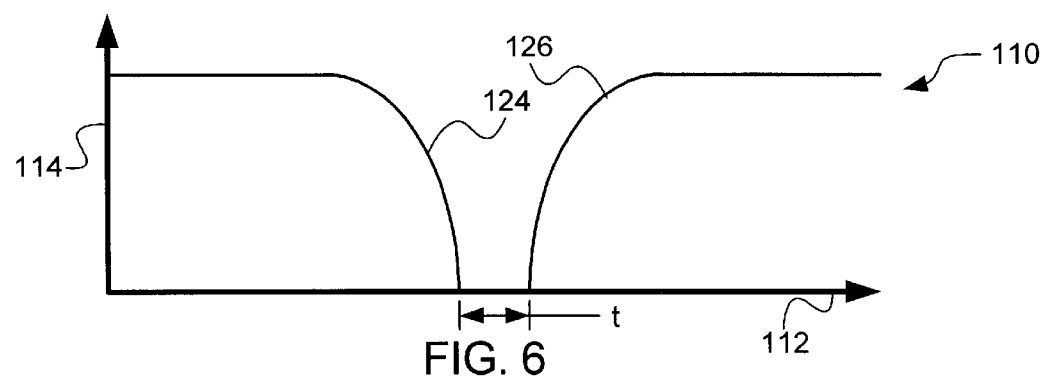
FIG. 6 is a schematic graph of light signals of an acceptable optical cross-connect switch in accordance with the present invention.

Referring now to FIG. 6, therein is shown a schematic graph 110 of reflected and through signals 124 and 126 of the optical cross-connect switch 50 in accordance with the system of the present invention. As the bubble is collapsed, the reflected signal 124 drops to zero and there is a time interval "t" before the through signal 126 appears and increases from zero to full value. In the one embodiment, the time interval "t" is approximately 1 ms and is considered acceptable for a properly operating optical cross-connect switch 50. The time interval "t" can then be used as a "standard" for acceptable optical cross-connect switches.

Figure 7:
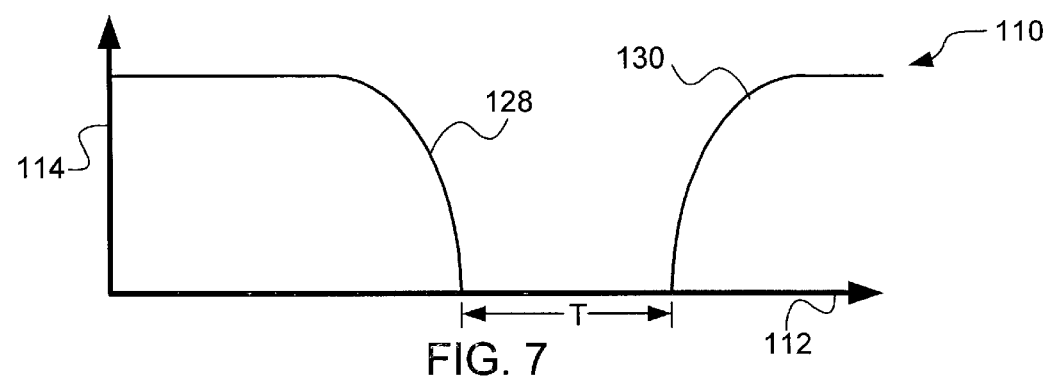
FIG. 7 is a schematic graph of light signals of a failed optical cross-connect switch in accordance with the present invention.

Referring now to FIG. 7, therein is shown a schematic graph 110 of reflected and through signals 128 and 130 of the optical cross-connect switch 50 which is unacceptable in accordance with the present invention. As the bubble is collapsed, the reflected signal 128 drops from full value to zero and there is a time interval "T" before the through signal 130 appears and increases from zero to full value. The time interval "T" is much larger than "t" , or 1 ms, and unacceptable since it provides an indication of a large amount of gas intrusion in the fluid.

Therefore, the present invention permits the detection of the intrusion of a gas, generally air, into the refractive index-matching fluid in the optical cross-connect switch 50 by improper handling during filling, by improper initial degassing, from leaks, or by osmosis. Essentially, the time for a acceptable optical cross-connect switch to switch is measured and used as a standard time for subsequent optical cross-connect switches to be measured. If the time for a switch less than the standard time, the optical cross-connect switch being tested would be acceptable and if the time is more than the standard time, the optical cross-connect switch being tested would be rejected.

By taking spaced apart measurements of an optical cross-connect switch in situ during operation, it is possible to determine the rate of gas intrusion and predict when the proportion of gas will increase to the point where the optical cross-connect switch 50 will fail. Thus, the present invention eliminates the possibility of unexpected catastrophic failures during operation of an entire fiber optic system, which includes the optical cross-connect switch 50.

While a system which uses a long fixed bubble creation pulse and measures the collapse time as described above works well for optical cross-connect switches for switches which have low amounts of absorbed gas, some optical cross-connect switches may tolerate higher amounts of absorbed gas but still require a sensitive gas intrusion detector and detection method.

For high absorbed gas optical cross-connect switches, an alternative detection method may be used in which multiple tests are performed with different bubble creation times or pulse widths, which are used to find a constant bubble collapse time. The amount of absorbed gas can be determined as a function of the inverse pulse width required to obtain the constant collapse time.

It has further been determined that both methods can be used in the same optical cross-connect switch to monitor gas concentrations over a very wide range.

As will be evident to those skilled in the art, the entire detector system including the optic fiber loop 100 and the detector 102 could be integrated into the optical cross-connect switch 50 as well as being a separate light and detector.

As will be further evident to those skilled in the art, the invention is applicable to any fluid-containing device where gas intrusion is critical.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters hitherto-fore set forth or shown in the accompanying drawings are to be interpreted in an illustrative and non-limiting sense.

The invention claimed is:

1. A system for detection of gas intrusion into a fluid containing device comprising:
   a fluid containing device having a plurality of optical waveguides and a trench provided therein, including a first waveguide and a second waveguide that intersect the trench such that optical coupling between the first and second waveguides is dependent upon a fluid at an intersection of the trench with the first and second waveguides, the fluid containing device including a fluid removal mechanism for removing fluid to the trench to switch the fluid containing device;
   an optical connection between first ends of the first and second waveguides;
   a light source for providing a light at a second end of the first waveguide; and
   a detector connected to detect the light at a second end of the second waveguide and to determine time required to return the fluid to the trench as an indicator of gas intrusion into the fluid containing device.

2. The system as claimed in claim 1 wherein the optical connection for the first ends of the first and second waveguides uses a fiber optic loop.

3. The system as claimed in claim 1 wherein the detector includes a mechanism for measuring the time required to return the fluid against a standard time to determine acceptability of the fluid containing device.

4. The system as claimed in claim 1 including a mechanism for predicting failure of the fluid containing device by removing the fluid a plurality of different times over a constant period of time and measuring the time required to return the fluid.

5. The system as claimed in claim 1 including a mechanism for predicting failure of the fluid containing device by measuring a plurality of different times the time required to remove the fluid while holding the time to return the fluid constant.

6. A method of detection of gas intrusion into a fluid containing device comprising:

provided a fluid containing device having a plurality of optical waveguides and a trench provided therein, including a first waveguide and a second waveguide that intersect the trench such that optical coupling between the first and second waveguides is dependent upon a fluid at an intersection of the trench with the first and second waveguides;

optically connecting first ends of the first and second waveguides;

providing a light at a second end of the first waveguide;

removing the fluid at the trench to switch the fluid containing device;

returning the fluid to the trench to switch the fluid containing device;

detecting the light at a second end of the second waveguide to detect the time required to return the fluid to the trench; and using the time required to return the fluid as an indicator of gas intrusion into the fluid containing device.

7. The method as claimed in claim 6 wherein optically connecting first ends of the first and second waveguides uses a fiber optic loop.

8. The method as claimed in claim 6 including measuring the time required to return the fluid against a standard time to determine acceptability of the fluid containing device.

9. The method as claimed in claim 6 including predicting failure of the fluid containing device by removing the fluid a plurality of different times over a constant period of time and measuring the time required to return the fluid.

10. The method as claimed in claim 6 including predicting failure of the fluid containing device by measuring a plurality of different times the time required to remove the fluid while holding the time to return the fluid constant.

11. A system for detection of gas intrusion into an optical cross-connect switch comprising:

an optical cross-connect switch having a plurality of optical waveguides and a trench provided therein, including a first waveguide and a second waveguide that intersect the trench such that light is transmitted through the first waveguide in the presence of a refractive index-matching fluid in the trench, is not fully transmitted through the first and the second waveguides as the fluid returns to the trench, and is reflected into the second waveguide in the absence of the fluid, the optical cross-switch including a fluid removal mechanism for removing the fluid to the trench to switch the optical cross-connect switch;

an optical connection between first ends of the first and second waveguides;

a light source for providing a light at a second end of the first waveguide; and a detector connected to detect light at a second end of the second waveguide the light transmitted, the light not fully transmitted, and the light reflected to detect the time required to remove the fluid to the trench and to determine the time required to return the fluid to the trench as an indicator of the gas intrusion into the optical cross-connect switch.

12. The system as claimed in claim 11 wherein the optical connection is a fiber optic loop.

13. The system as claimed in claim 11 wherein the detector includes a timer for measuring the time against a standard time and accepting the optical cross-connect switch where the time is less than the standard time.

14. The system as claimed in claim 11 wherein the detector includes a mechanism for predicting failure of the optical cross-connect switch by using the fluid removal mechanism a plurality of different times over a constant period of time and measuring the time required to return the fluid.

15. The system as claimed in claim 11 wherein the detector includes a mechanism for predicting failure of the optical cross-connect switch by measuring a plurality of different times the time the fluid removal mechanism is used while holding the time to return the fluid constant.

16. A method of detection of gas intrusion into an optical cross-connect switch comprising:

providing an optical cross-connect switch having a plurality of optical waveguides and a trench provided therein, including a first waveguide and a second waveguide that intersect the trench such that light is transmitted through the first waveguide in the presence of a refractive index-matching fluid in the trench, is not fully transmitted through the first and second waveguides as the fluid returns to the trench, and is reflected into the second waveguide in the absence of the fluid;

optically connecting first ends of the first and second waveguides;

providing a light at a second end of the first waveguide;

removing the fluid at the trench to switch the optical cross-connect switch to make an optical connection;

returning the fluid to the trench to switch the optical cross-connect switch to break an optical connection;

detecting at a second end of the second waveguide the light transmitted, the light not fully transmitted, and the light reflected to detect the time required to return the fluid to the trench; and determining the time required to return the fluid to the trench as an indicator of the gas intrusion into the optical cross-connect switch.

17. The method as claimed in claim 16 wherein optically connecting first ends of the first and second waveguides uses a fiber optic loop.

18. The method as claimed in claim 16 including measuring the time against a standard time and accepting the optical cross-connect switch where the time is less than the standard time.

19. The method as claimed in claim 16 including predicting failure of the optical cross-connect switch by removing the fluid a plurality of different times over a constant period of time and measuring the times required to return the fluid.

20. The method as claimed in claim 16 including predicting failure of the optical cross-connect switch by measuring a plurality of different times the time required to remove the fluid while holding the time to return the fluid constant.

* * * * *